ized Patent [19]

United States Patent [19]
Vincent et al.

[11] Patent Number: 4,594,906
[45] Date of Patent: Jun. 17, 1986

[54] POWER TAKE-OFF MECHANISMS

[76] Inventors: Martin P. Vincent, 1 Pennine Close, Upperthon, Holmfirth, Huddersfield West Yorkshire; Roger M. Weyman, Alverley Lodge Farm, Alverley, Doncaster, South Yorkshire, both of England

[21] Appl. No.: 585,482

[22] Filed: Mar. 1, 1984

[30] Foreign Application Priority Data

Mar. 3, 1983 [GB] United Kingdom ............... 8305935

[51] Int. Cl.⁴ .................. F16H 37/00; F16H 57/10; F16D 67/02
[52] U.S. Cl. ................. 74/15.4; 74/411.5; 74/15.6; 192/17 R
[58] Field of Search ............ 74/15.4, 15.6, 15.63, 74/15.66, 15.69, 411.5; 192/17 R, 4 C, 48.5

[56] References Cited

U.S. PATENT DOCUMENTS

| 780,733 | 1/1905 | Smith | 192/4 C |
|---|---|---|---|
| 1,662,566 | 3/1928 | Döhle | 192/4 C |
| 1,862,871 | 6/1932 | Tremolada | 192/4 C |
| 2,443,313 | 6/1948 | Gerst | 192/4 C |
| 2,475,997 | 7/1949 | Smith | 192/4 C |
| 2,606,461 | 8/1952 | Herndon | 192/4 C |
| 2,967,596 | 1/1961 | Page | 192/4 C |
| 3,059,742 | 10/1962 | Troemner et al. | 74/15.63 |
| 3,507,372 | 4/1970 | Gibertson et al. | 74/411.5 |
| 3,513,712 | 5/1970 | Zajichek et al. | 74/15.69 |
| 3,715,704 | 2/1973 | Boyle et al. | 74/15.14 |
| 3,991,629 | 11/1976 | Dearnley | 74/15.4 |
| 4,192,410 | 3/1980 | Poirier | 192/4 C |
| 4,287,778 | 9/1981 | Quick | 74/15.4 |
| 4,330,053 | 5/1982 | Gesenhaus | 74/411.5 |
| 4,503,957 | 3/1985 | Ikemoto et al. | 192/4 C |

FOREIGN PATENT DOCUMENTS

| 634816 | 1/1962 | Canada | 74/15.63 |
|---|---|---|---|
| 2056598 | 3/1981 | United Kingdom | 74/411.5 |

Primary Examiner—Lawrence J. Staab
Assistant Examiner—Michael D. Bednarek

[57] ABSTRACT

In a tractor power take-off mechanism comprising an input shaft driveable from an engine by a friction clutch and a two-speed power take-off shaft driveable from the input shaft by gearing including a disengageable toothed driving member operable by a hand lever by way of a selector fork, the disengageable toothed driving member can be difficult and noisy to engage because the input shaft tends to rotate due to inertia and drag when the friction clutch is disengaged. The input shaft is therefore provided with a band brake applied by initial movement of the hand lever in a direction to engage the disengageable toothed driving member and held applied while an operating load is being exerted on the lever in that direction. A conventional detent holding the selector fork in disengaged position provides the resistance required to cause the brake to be applied before the lever can move the fork into engaged position.

11 Claims, 4 Drawing Figures

POWER TAKE-OFF MECHANISMS

BACKGROUND OF INVENTION

This invention relates to power take-off mechanisms of the type including a power input shaft driveable from an engine by a friction clutch at one end of said shaft, and a two-speed power take-off shift driveable by gearing which includes disengageable toothed driving means and is disposed at the other end of the input shaft.

The disengageable toothed driving means of such mechanisms must only be operated when the friction clutch is disengaged. However, said means can be difficult and noisy to engage because the power input shaft tends to rotate due to inertia and drag when the friction clutch is disengaged. The object of the present invention is to overcome this problem.

SUMMARY OF INVENTION

According to the invention, a power take-off mechanism comprises a power input shaft driveable from an engine by a friction clutch at one end of said shaft, a two-speed power take-off shaft driveable by gearing which includes disengageable toothed driving means and is disposed at the other end of the input shaft, a control lever for operating the disengageable toothed driving means by way of a selector fork, and a brake for the input shaft applied by initial movement of the control lever in a direction to engage the disengageable toothed driving means and held applied whilst an operating load is being exerted on said lever in said direction.

BRIEF DESCRIPTION OF DRAWINGS

Two embodiments of the invention will now be described, by way of example, with reference to the accompanying drawings of which:-

DESCRIPTION OF PREFERRED EMBODIMENTS

Figure 1:
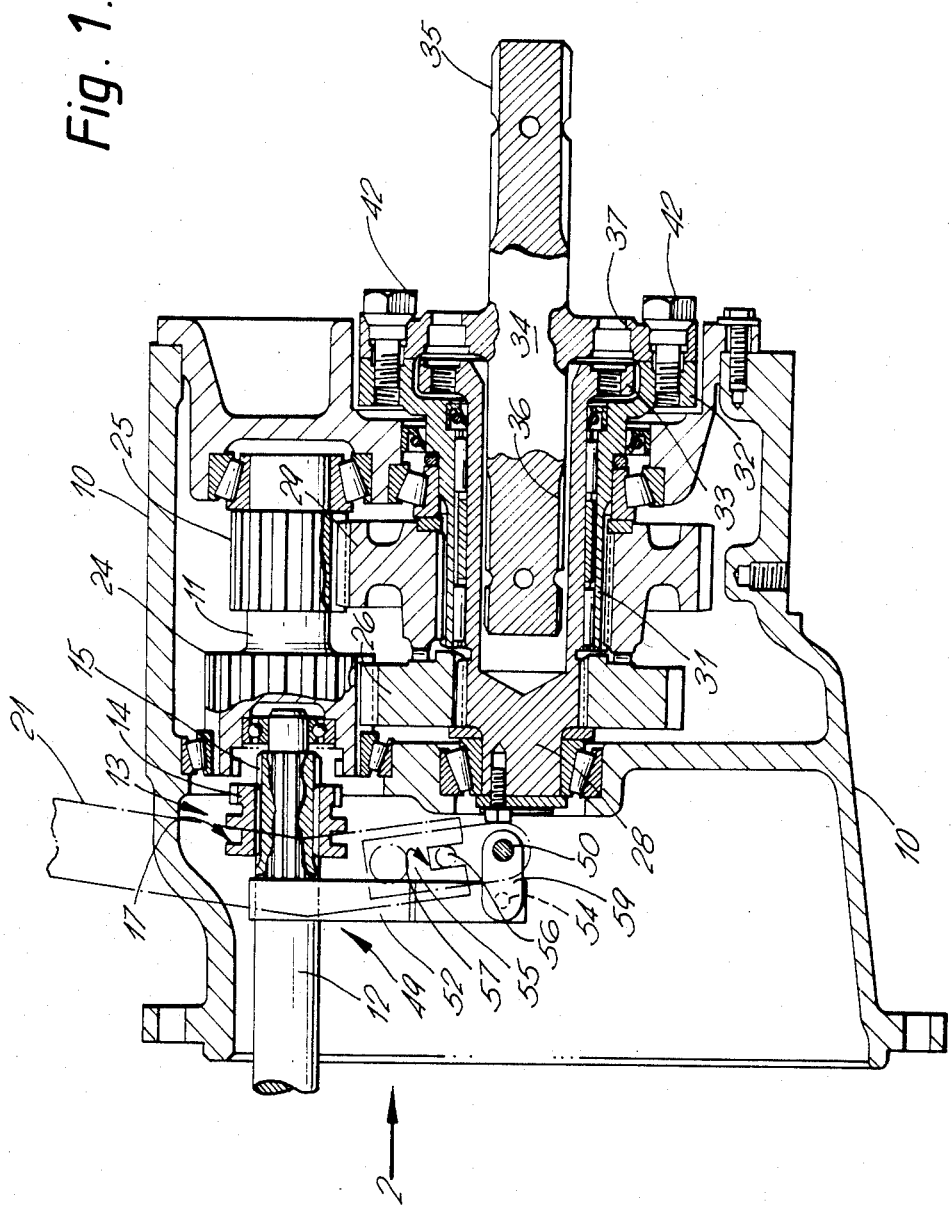
FIG. 1 is a sectional side elevation of a two-speed power take-off mechanism, for an agricultural tractor, of the type having its power take-off shaft reversible end-for-end.
Figure 2:
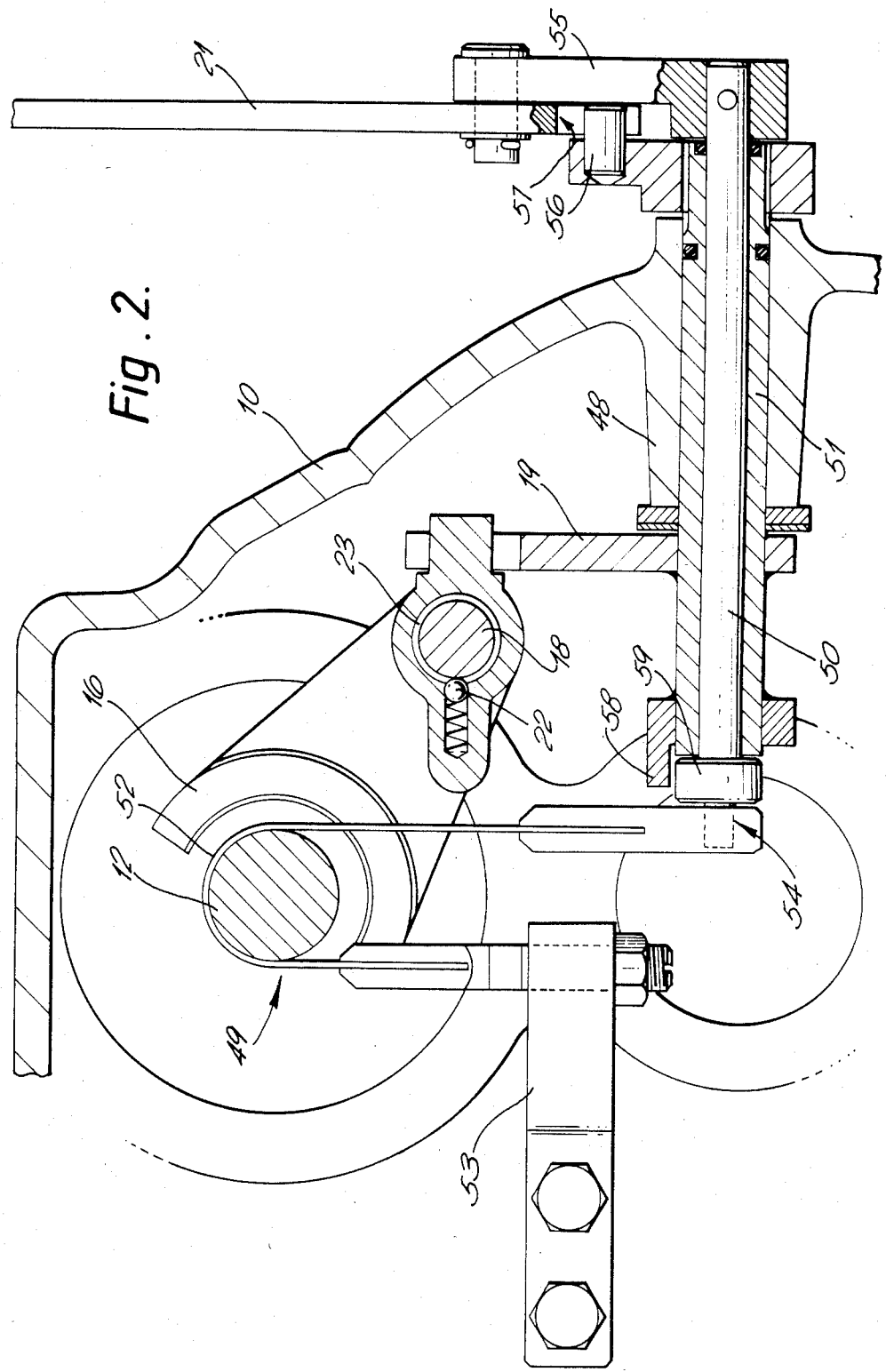
FIG. 2 is a part-sectional elevation in the direction of the arrow 2 in FIG. 1.
Figure 3:
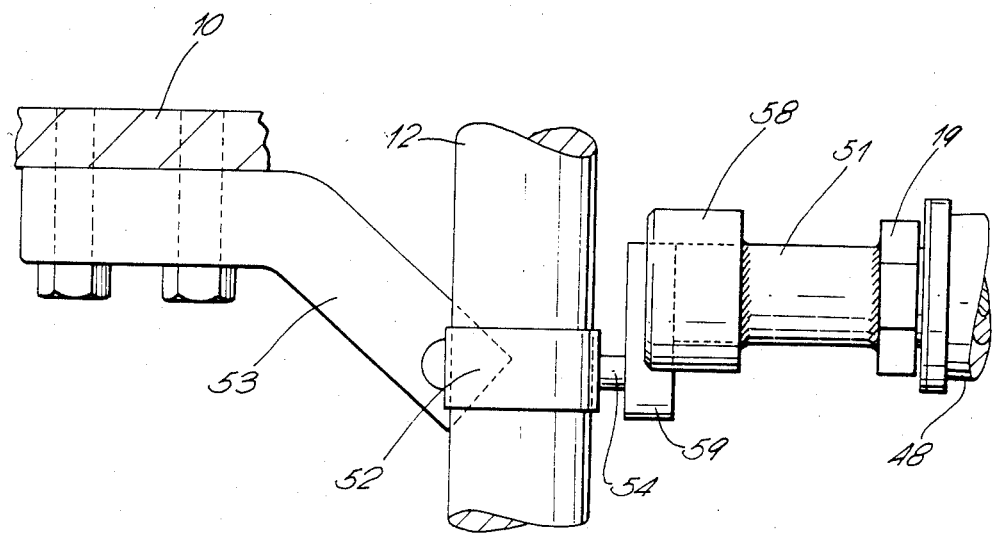
FIG. 3 is a plan view of part of FIG. 2.

Referring now to FIGS. 1 to 3, one embodiment of two-speed power take-off mechanism for an agricultural tractor comprises a casing 10 housing a power input shaft 12 driveable from the tractor's engine by a friction clutch (not shown) at one end of said shaft, and a countershaft 11 co-axial with the input shaft 12 and capable of being connected thereto by a single dog clutch indicated generally at 13 which constitutes disengageable toothed driving means of the mechanism. Two gears 24 and 25 of different pitch circle diameters are fixed on (which expression if herein intended to mean integral with or rigidly secured on) the countershaft 11; a hollow drive shaft 28 parallel to the countershaft 11 has fixed on it a gear 26 meshing with the gear 24 and, at its rear end, a flange 33; and a drive sleeve 31 surrounding the drive shaft 28 has fixed on it a gear 29 meshing with the gear 25 and, at its rear end, a flange 32 the rear face of which lies in the same plane as that of the flange 33. The hollow drive shaft 28 and the drive sleeve 31 are therefore rotateable simultaneously at different speeds. A power take-off shaft 34 has differently splined end zones 35 and 36 each adapted to fit inoperatively within the hollow drive shaft 28, and a flange 37 between said zones adapted to be secured by set screws 42 to either one of the flanges 32 and 33 with axial clearance between the other of said flanges and the flange 37. Thus by turning the power take-off shaft 34 end-for-end in known manner it can be caused to rotate at, say, 540 revolutions per minute with a six-splined end zone projecting operably or 1000 revolutions per minute with a twenty-one splined end zone projecting operably. The dog clutch 13 comprises an externally toothed clutch sleeve 14 slideably on splines 15 at the rear end of the input shaft 12 by a selector fork 16 engaging in an annular groove 17 in the sleeve 14. The selector fork 16 is slideable on a dead shaft 18 by a hand control lever 21 between two positions in which the dog clutch 13 is respectively engaged and disengaged, and is held in each of said positions by conventional detent means consisting of a spring-loaded ball 22 in the selector fork 16 engageable in either of two annular grooves 23 in the dead shaft 18.

The input shaft 12 is provided with a band brake indicted generally at 49 which is operated by the control lever 21 in interdependence on the operation thereby of the dog clutch 13 as hereinafter described. To this end, a sleeve 51 is journalled in a bore formed through a boss 48 on a side wall of the casing 10, the axis of said bore lying in a plane perpendicular to the axes of the input shaft 12 and the power take-off shaft 34, and a spindle 50 is journalled in the sleeve 51. A brake band 52 is adjustably anchored at one end to a bracket 53 fixed within the casing 10, and is engageable with the input shaft 12 through an angle of 180°. The brake band 52 is offset from the axis of the spindle 50 as shown in FIG. 3, and its free end is operatively connected to a crank-pin 54 on a radial arm 59 formed at one end of the spindle 50. A radial arm 55 rigidly secured on the other, outer end of the spindle 50 is pivotally connected to the control lever 21 near one end thereof. The sleeve 51 has a crank-pin 56 at its outer end engaging in a fork 57 at said one end of the control lever 21, a radial arm 19 for moving the selector fork 16 along the dead shaft 18 is welded between the ends of the sleeve 51, and a stop 58 hereinafter referred to is welded to the inner end of the sleeve 51.

In operation, movement of the control lever 21 in a direction to engage the dog clutch 13 is initially resisted by the detent means 22 in the selector fork 16. The sleeve 51 therefore remains temporarily stationary and the control lever 21 fulcrums about the crank-pin 56 on the sleeve 51 and turns the spindle 50 to apply the band brake 49 thus ensuring that the input shaft 12 is at rest. When the force applied to the brake band 52 exceeds that required to overcome the detent means 22, the spindle 50 ceases to turn and continued movement of the control lever 21 in said direction causes said lever to fulcrum about its pivotal connection to the radial arm 55 on the spindle 50 and turn the sleeve 51 to move the selector fork 16 and engage the dog clutch 13 without difficulty or noise. When the selector fork 16 is held in engaged position by its detent means 22 and the operating load is removed from the control lever 21, there are sufficient clearances in the system to permit the release of the band brake 49. Engagement of the friction clutch then operates the power take-off shaft 34 at that one of the two available speeds determined by its orientation relative to the rest of the mechanism. When the friction clutch has been disengaged and the control lever 21 is moved in a direction to disengage the dog clutch 13, the resistance offered by the detent means 22 in the selector fork 16 causes the sleeve 51 to remain temporarily stationary and the control lever 21 initially fulcrums about the crank-pin 56 on the sleeve 51 and turns the spindle 50 in a direction to slacken the brake band 52 until the radial arm 59 on the spindle 50 contacts the stop 58 at the inner end of the sleeve 51. Continued movement of the control lever 21 in said direction then causes said lever, the spindle 50 and the sleeve 51 to turn in unison so as to move the selector fork 16 and disengage the dog clutch 13.

Figure 5:
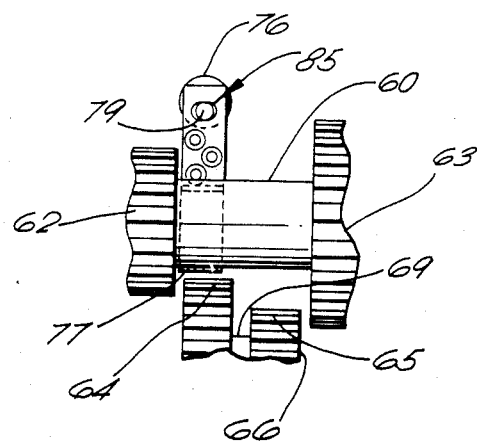
FIG. 5 is a section on the line 5—5 in FIG. 4.
Figure 4:
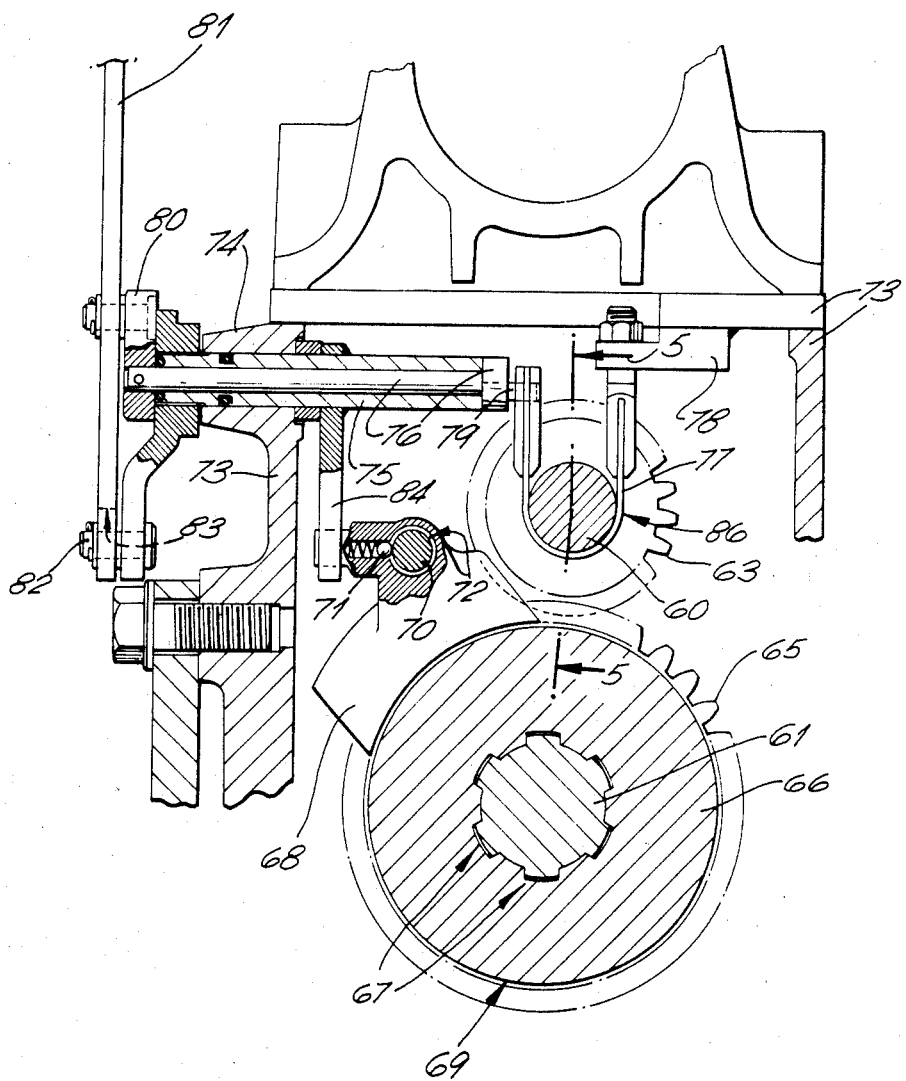
FIG. 4 is a sectional rear elevation of a two-speed power take-off mechanism, for an agricultural tractor, of the type incorporating change-speed gearing.

Referring now to FIGS. 4 and 5, another embodiment of two-speed power take-off mechanism for an agricultural tractor comprises a power input shaft 60 driveable from the tractor's engine by a friction clutch (not shown) at one end of said shaft, and a power take-off shaft 61 disposed in parallel overlapping relationship to the other end of the input shaft 60. Two gears 62 and 63 of different pitch circle diameters are fixed on the input shaft 60, and are capable of meshing respectively with two gears 64 and 65 formed integrally on a common hub 66 which is slideable on splines 67 on the power take-off shaft 61 and constitutes disengageable toothed driving means of the mechnism. A selector fork 68 engaging in an annular groove 69 in the hub 66 is moveable along a dead shaft 70 between three positions in the middle, neutral one of which there is no drive to the power take-off shaft 61 as shown in FIG. 5, in one end one of which said shaft is driven by way of the gears 62 and 64, and in the other end one of which said shaft is driven by way of the gears 63 and 65. The selector fork 68 is held in every one of its three positions by conventional detent means consisting of a spring-loaded ball 71 in the selector fork 68 engageable in any of three annular grooves 72 in the dead shaft 70. The mechanism is housed within a casing 73, through a boss 74 on a side wall of which there is formed a bore the axis of which lies in a plane perpendicular to the axes of the input shaft 60 and the power take-off shaft 61. Journalled in the bore is a sleeve 75 surrounding a spindle 76. A band brake indicated generally at 86 comprises a brake band 77 which is adjustably anchored at one end to a bracket 78 fixed within the casing 73, and in engageable with the input shaft 60 through an angle of 180°. The brake band 77 is in line with the axis of the spindle 76 as shown in FIG. 5, and its free end has a slot 85 enabling it to be operatively connected to a crank-pin 79 at one end of the spindle 76. A radial arm 80 rigidly secured on the other, outer end of the spindle 76 is pivotally connected to a hand control lever 81 near one end thereof. The sleeve 75 has a crank-pin 82 at its outer end engaging in a fork 83 at said one end of the control lever 81, and a radial arm 84 welded between its ends for moving the selector fork 68 along the dead shaft 70.

In operation, movement of the control lever 81 in either direction away from neutral in order to engage together either the gears 62 and 64 or the gears 63 and 65 is initially resisted by the detent means 71 in the selector fork 68. The sleeve 75 therefore remains temporarily stationary and the control lever 81 fulcrums about a crank-pin 82 on the sleeve 75 and turns the spindle 76 so that its crank-pin 79 moves arcuately to one side of its dead centre position shown in FIG. 5 to apply the band brake 86 thus ensuring that the input shaft 60 is at rest. When the force applied to the brake band 77 exceeds that required to overcome the detent means 71, the spindle 76 ceases to turn and continued movement of the control lever 81 in said direction causes said lever to fulcrum about its pivotal connection to the radial arm 80 on the spindle 76 and turn the sleeve 75 to move the selector fork 68 and engage the chosen pair of gears 62, 64 or 63, 65 without difficulty or noise. When the selector fork 68 is held in the chosen engaged position by its detent means 71 and the operating load is removed from the control lever 81, there are sufficient clearances in the system to permit the release of the bank brake 86. Engagement of the friction clutch then operates the power take-off shaft 61 at that one of the two available speeds determined by whichever meshing pair of gears 62, 64 or 63, 65 is transmitting drive thereto from the input shaft 60. When the friction clutch has been disengaged and the control lever 81 is moved back towards neutral, the resistance offered by the detent means 71 causes the sleeve 75 to remain temporarily stationary and the control lever 81 initially fulcrums about the crank-pin 82 on the sleeve 75 and turns the spindle 76 so that its crank-pin 79 passes arcuately through and to the other side of its dead centre position to reapply the band brake 86 for the purpose of providing a force exceeding that required to overcome the detent means 71. The spindle 76 then ceases to turn and continued movement of the control lever 81 towards neutral causes said lever to fulcrum about its pivotal connection to the radial arm 80 on the spindle 76 and turn the sleeve 75 to move the selector fork 68 and disengage whichever pair of gears 62, 64 or 63, 65 has been in mesh. When the selector fork 68 is held in the disengaged position by its detent means 71 and the operating load is removed from the control lever 81, the clearances in the system again permit the release of the band brake 86.

In a modification of the embodiment shown in FIGS. 4 and 5, the gears 64 and 65 are individually rotateably but non-slideably mounted on the power take-off shaft 61 in constant mesh with the gears 62 and 63 respectively, and are adapted to be alternatively driveably connected to said shaft by a double dog clutch disposed between them which constitutes disengageable toothed driving means of the mechanism and is slideable between a middle, neutral position and two engaged positions by the selector fork 68.

Other kinds of brakes can equally well be employed.

We claim:

1. A power take-off mechanism comprising a power input shaft driveable from an engine by a friction clutch at one end of said shaft, a two-speed power take-off shaft driveable by gearing which includes disengageable toothed driving means and is disposed at the other end of the input shaft, a control lever for operating the disengageable toothed driving means by way of a selector fork, and a brake for the input shaft applied by initial movement of the control lever out of disengaged position in a direction to engage the disengageable toothed driving means and then held temporarily applied as long as an operating load continues to be exerted on said lever in said direction to effect engagement of the disengageable toothed driving means.

2. A power take-off mechanism according to claim 1, wherein a detent holding the selector fork in disengaged position provides the resistance required to cause the brake to be applied before said fork is moved into engaged position.

3. A power take-off mechanism according to claim 1 or claim 2, wherein the brake is a band brake.

4. A power take-off mechanism according to claim 2, wherein the brake is a band brake, a spindle has a crank-pin at one end operatively connected to the free end of the brake band and a radial arm at the other end pivotally connected to the control lever near one end thereof, and a sleeve surrounds the spindle and has a radial arm for moving the selector fork and a crank-pin at one end engaging in a fork at said one end of the control lever.

5. A power take-off mechanism according to claim 1, wherein the gearing comprises a countershaft co-axial with the input shaft; two gears of different pitch circle diameters fixed on the countershaft; a hollow drive shaft parallel to the countershaft and having fixed on it a gear meshing with one of the gears on the countershaft and, at its rear end, a flange; and a drive sleeve surrounding the drive shaft and having fixed on it a gear meshing with the other of the gears on the countershaft and, at its rear end, a flange the rear face of which lies in the same plane as that of the flange on the drive shaft; wherein the power take-off shaft has differently splined end zones each adapted to fit inoperatively within the hollow drive shaft and a flange between said zones adapted to be secured to the appropriate one of the flanges on the drive shaft and drive sleeve with axial clearance between the other of the last-mentioned flanges and the flange on the power take-off shaft, and wherein the disengageable toothed driving means comprise a single dog clutch capable of connecting the countershaft to the input shaft.

6. A power take-off mechanism according to claim 4, wherein the gearing comprises a countershaft co-axial with the input shaft; two gears of different pitch circle diameters fixed on the countershaft; a hollow drive shaft parallel to the countershaft and having fixed on it a gear meshing with one of the gears on the countershaft and, at its rear end, a flange; and a drive sleeve surroundin the drive shaft and having fixed on it a gear meshing with the other of the gears on the countershaft and, at its rear end, a flange the rear face of which lies in the same plane as that of the flange on the drive shaft; wherein the power take-off shaft has differently splined end zones each adapted to fit inoperatively within the hollow drive shaft and a flange between said zones adapted to be secured to the appropriate one of the flanges on the drive shaft and drive sleeve with axial clearance between the other of the last-mentioned flanges and the flange on the power take-off shaft, wherein the disengageable toothed driving means comprise a single dog clutch capable of connecting the countershaft to the input shaft, and wherein the crank-pin on the spindle contacts a stop on the sleeve when disengagement of the dog clutch is initiated.

7. A power take-off mechanism according to claim 1, wherein the input shaft and the power take-off shaft are parallel to one another and the gearing comprises two gears of different pitch circle diameters fixed on one of said shafts and alternatively capable of meshing with respective gears formed integrally on a common hub which is slideably but non-rotateably mounted on the other of said shafts and constitutes the disengageable toothed driving means.

8. A power take-off mechanism according to claim 4, wherein the input shaft and the power take-off shaft are parallel to one another and the gearing comprises two gears of different pitch circle diameters fixed on one of said shafts and alternatively capable of meshing with respective gears formed integrally on a common hub which is slideably but non-rotateably mounted on the other of said shafts and constitutes the disengageable toothed driving means.

9. A power take-off mechanism according to claim 1, wherein the input shaft and the power take-off shaft are parallel to one another and the gearing comprises two gears of different pitch circle diameters on the input shaft meshing respectively with two gears on the power take-off shaft, the two gears on one of said shafts being fixed thereon and the two gears on the other of said shafts being rotateably mounted thereon and adapted to be alternatively driveably connected thereto by a double dog clutch which constitutes the disengageable toothed driving means.

10. A power take-off mechanism according to claim 4, wherein the input shaft and the power take-off shaft are parallel to one another and the gearing comprises two gears of different pitch circle diameters on the input shaft meshing respectively with two gears on the power take-off shaft, the two gears on one of said shafts being fixed thereon and the two gears on the other of said shafts being rotatably mounted thereon and adapted to be alternatively driveably connected thereto by a double dog clutch which constitutes the disengageable toothed driving means.

11. A power take-off mechanism comprising a power input shaft driveable from an engine by a friction clutch at one end of said shaft, a two-speed power take-off shaft driveable by gearing which includes disengageable toothed driving means and is disposed at the other end of the input shaft, a control lever for operating the disengageable toothed driving means by way of a selector fork, and a brake for the input shaft applied by initial movement of the control lever about a first pivot in a direction to engage the disengageable toothed driving means and then held applied whilst further movement of said lever in said direction about a second pivot operates to engage the disengageable toothed driving means.

* * * * *